United States Patent [19]

Scheidl et al.

[11] 4,008,193
[45] Feb. 15, 1977

[54] STABILIZER COMBINATION FOR HALOGEN-CONTAINING POLYMERS

[75] Inventors: Franz Scheidl; Herbert Nies, both of Gersthofen, Germany

[73] Assignee: Hoechst Aktiengesellschaft, Frankfurt am Main, Germany

[22] Filed: Sept. 23, 1975

[21] Appl. No.: 616,071

[30] Foreign Application Priority Data

Sept. 27, 1974 Germany .......................... 2446116

[52] U.S. Cl. .......................... 260/23 XA; 252/384; 260/45.75 R; 260/45.75 W
[51] Int. Cl.$^2$ .......................... C08L 91/00
[58] Field of Search ........ 260/45.75, 45.85, 23 XA, 260/45.75 W; 252/384

[56] References Cited

UNITED STATES PATENTS

| | | | |
|---|---|---|---|
| 3,003,998 | 3/1960 | Kauder | 260/45.75 |
| 3,003,999 | 10/1961 | Kauder | 260/45.75 |
| 3,004,000 | 10/1961 | Kauder | 260/45.75 |

OTHER PUBLICATIONS

Skeist, "Handbook of Adhesives" 1962, pp. 90, 261, 265.

Primary Examiner—Donald E. Czaja
Assistant Examiner—William E. Parker
Attorney, Agent, or Firm—Connolly and Hutz

[57] ABSTRACT

Halogen-containing polymers are heat-stabilized by physiologically unobjectionable mixtures consisting of 10 to 70% by weight of an aluminum salt, 10 to 80% by weight of a calcium salt and 10 to 70% by weight of a zinc salt of an aliphatic mono- or dicarboxylic acid or an aromatic mono-, di-, or tricarboxylic acid.

8 Claims, No Drawings

STABILIZER COMBINATION FOR HALOGEN-CONTAINING POLYMERS

This invention relates to a physiologically harmless and effective heat-stabilizer combination for halogen-containing polymers.

During processing halogen-containing polymers are generally heated to quite elevated temperature in grinding, mixing and shaping operations. Polymers and copolymers of vinyl chloride and vinylidene chloride are especially sensitive to heat. At elevated temperature they become brittle, change their color or are damaged otherwise so that they are no longer suitable for the most purposes, particularly as packing material. Therefore, heat stabilizers are usually added to halogen-containing plastics materials to prevent the polymers from decomposing during processing or at least to suppress decomposition as far as possible.

The known stabilizers containing lead, barium and cadmium salts, which are generally used, are very toxic and, hence, they are absolutely unsuitable as additives in the manufacture of packing materials for foodstuffs. Tin-organic compounds have also satisfactory stabilizing properties but the commercial tin stabilizers are expensive and most of them are also toxic.

As non toxic and cheap heat stabilizers for halogen-containing plastics materials mixtures of alkaline earth metal salts and polyhydric alcohols have been proposed (cf. German Pat. No. 1,241,106, U.S. Pat. Nos. 3,003,998; 3,003,999; and 3,004,000). Stabilizer combinations of this type consisting of calcium and zinc salts of fatty acids or benzoic acid, on the one hand, and polyalcohols such as sorbital, pentaerythritol and glycerol, on the other, are considered physiologically harmless but their stabilizing effect at elevated temperature is not very good and the color of the mouldable compositions made therewith is not satisfactory.

It is the object of the present invention to develop physiologically harmless and effective stabilizer combinations for halogen-containing plastic materials, especially for packing materials to be used for foodstuffs, which do not alter the color of the polymers, do not impair their properties and can be produced with little expense.

The present invention therefore provides a stabilizer combination for halogen-containing polymers to stabilize them against the detrimental action of heat, which combination consists of a mixture of metal salts of aliphatic mono- or dicarboxylic acids having from 6 to 40 carbon atoms or optionally alkyl- or alkoxy-substituted aromatic mono- di- or tricarboxylic acids having from 7 to 25 carbon atoms in the molecule, the mixture being composed of 10 to 70% by weight of an aluminum salt, 10 to 80% by weight of a calcium salt and 10 to 70% by weight of a zinc salt of the said acids.

It was surprising and could not have been foreseen that the combination according to the invention has a much better stabilizing effect on halogen-containing polymers than mixtures of calcium and zinc salt, of aluminum and zinc salt, or of aluminum and calcium salt, since an aluminum salt alone exhibits practically no stabilizing effect. Thus, the addition of the aluminum salt to the first mentioned known two-component mixture has obviously a synergistic effect. In PVC processing, for example, the time until decomposition sets in is by 30 to 50% longer. In addition to the desired improved heat stability the mouldable compositions have a very light color and an improved transparency.

Halogen-containing polymers that can be processed with the addition of the stabilizer combination of the invention include organic polymers containing halogen atoms, preferably chlorine atoms bound to the polymer chain, such as, for example, homopolymers of vinyl chloride and vinylidene chloride; copolymers and graft polymers of vinyl chloride and vinylidene chloride with other copolymerizable ethylenically unsaturated monomers, for example olefins such as ethylene, propylene, or butylene; vinyl esters of linear or branched carboxylic acids having from 2 to 20 and preferably 2 to 4 carbon atoms, for example vinyl acetate, propionate, butyrate, -2-ethylhexoate; vinyl-isotridecanoic acid esters; vinyl halides such as vinyl fluoride, vinylidene fluoride, vinylidene chloride; vinyl ethers, vinyl pyridine, unsaturated acids such as maleic, fumaric, acrylic, methacrylic acid and the mono- or diesters thereof with mono- or dialcohols having from 1 to 10 carbon atoms; acrylonitrile, sytrene, and N-substituted maleic imides. The copolymers can also be prepared from mixtures of the aforesaid monomers.

Graft polymers on the basis of vinyl chloride and vinylidene chloride, which can be stabilized according to the invention, can be produced with the use of elastomeric polymers which have been obtained by polymerizing one or several of the following monomers: dienes such as butadiene, cyclopentadiene; olefins such as ethylene and propylene; styrene, unsaturated acids such as acrylic and methacrylic acid, as well as the esters thereof with mono- or dialcohols having from 1 to 10 carbon atoms; acrylonitrile, vinyl compounds such as vinyl esters of linear and branched carboxylic acids having from 2 to 20 and preferably 2 to 4 carbon atoms, vinyl halides such as vinyl chloride and vinylidene chloride.

In the case of co- and graft polymers the proportion of basic monomer, such as vinyl chloride or vinylidene chloride, preferably amounts to at least 70% by weight, more preferably at least 80% by weight.

The stabilizer combinations according to the invention can also be used to stabilize mixtures of different halogen-containing polymers or mixtures of halogen-containing with halogen-free polymers.

Metal salts of aliphatic or aromatic carboxylic acids mean to include zinc, calcium and aluminum salts, the latter in the form of neutral or basic salts of the formula $Al(OH)_xR_y$ in which $x$ is zero to 2.5, $y$ is 0.5 to 3, $x + y$ is 3 and R represents the carboxyl radical. The carboxylic acids from which the salts to be used derive are saturated or unsaturated, linear or branched, aliphatic mono- and dicarboxylic acids having from 6 to 40 and preferably from 12 to 24 carbon atoms in the molecule, for example caproic acid, caprylic acid, pelargonic acid, capric acid, 3,5,5-trimethylhexanoic acid, myristic acid, arachic acid, behenic acid, preferably 2-ethylhexanoic acid, lauric acid, palmitic acid, stearic acid, oleic acid and linoleic acid, tall oil fatty acids, coconut fatty acid and soybean fatty acid, adipic acid, sebacic acid, suberic acid and the so-called "dimeric fatty acids" i.e. carboxylic acids obtained in an industrial process by dimerization of unsaturated fatty acids. There are also suitable the salts of aromatic mono-, di-, or tri-carboxylic acids having from 7 to 25 carbon atoms, which may be substituted one or several times in the nucleus by alkyl, isoalkyl, or alkoxy groups having up to 12 carbon atoms, preferably 1 to 6 carbon atoms, for example benzoic acid, alkylbenzoic acids, such as toluic acids and dodecyl benzoic acid, anisic acid, phthalic acids, trimellitic acid, and naphthalene carboxylic acids. From among the aromatic carboxylic acids benzoic acid is preferred.

The stabilizer combination according to the invention consists of 10 to 70 and preferably 20 to 50% by weight of aluminum salt, 10 to 80 and preferably 30 to 70% of calcium salt and 10 to 70 and preferably 20 to 50% of zinc salt, the percentages being calculated on the total mixture. The three components are preferably used in a proportion by weight of 1 : 1 : 1.

Especially good results are obtained with the stearates of the aforesaid metals. It is likewise possible to combine salts with different acid radicals, for example aluminum pentahydroxybenzoate, calcium stearate and zinc-2-ethyl-hexanoate. Of course, salts which formally consist of one metal and mixtures of different acids may also be used, for example a mixture of 0.5 part by weight aluminum stearate, 0.5 part by weight aluminum benzoate, 1 part by weight calcium stearate and 1 part by weight zinc stearate. Still further, the acid radicals bound to one and the same metal may be different.

The stabilizer combination according to the invention is used in an amount of from about 0.1 to 10 and preferably 0.5 to 5 and more preferably 1 to 2 parts by weight for 100 parts by weight of polymer to be stabilized. They are especially suitable for stabilizing vinyl halide polymers. The polymer can be rigid or soft. Rigid polymers additionally contain, incorporated therewith, lubricants, pigments, fillers, agents modifying the impact strength, and the like, while soft polymers contain plasticizers such as phthalic acid, adipic acid, or phosphoric acid esters, plasticizing polymer components such as low molecular weight polyesters, chloropolyolefins or in many cases also chloroparaffins. The halogen-containing polymers to be stabilized by the stabilizer combination according to the invention may, of course, also contain known costabilizers such as epoxides, for example epoxidized soybean oil, phenolic antioxidants such as 2,6-di-t-butyl-4-methylphenol and 2,2-(4,4'-dihydroxydiphenyl)-dimethylmethane, α-phenylindole, polyhydric alcohols such as trimethylol propane, as well as organic phosphites, such as trisnonylphenyl phosphite.

The stabilizer combination is added to the polymer in the form of a mixture or separately as individual components according to the usual known processes. They are especially suitable in the processing of PVC to be used as packing material for foodstuffs.

The following examples illustrative the invention. The parts are parts by weight. To evaluate the heat stability a color chart was used comprising FIGS. 1 to 5 having the following meaning:

1 water white
2 minor yellow hue
3 strongly yellow
4 deep yellow-brown
5 dark brown to black

EXAMPLES 1 to 6

100 Parts of suspension polyvinyl chloride having a K value of 70 were intimately mixed with 35 parts dioctyl phthalate, 2 parts of epoxidized soybean oil, 0.2 part of the ethylene diamide of stearic acid and the stabilizer indicated in the following table 1.

The mixtures were then rolled on a laboratory two-roll mill heated to 180° C to a rough sheet during 1 minute at 20 revolutions per minute. Rolling was continued and at intervals of 10 minutes samples were taken the color of which was compared with the colors of the chart. The experiments were discontinued when the rolled sheet had acquired a dark brown or black color.

Table 1 clearly shows that in PVC stabilization the combination according to the invention of Example 6 is distinctly superior to the combinations of two components, i.e. Ca stearate/Zn stearate (Examples 2 and 3), Ca stearate/Al stearate (Example 4) and Zn stearate/Al stearate (Example 5).

Aluminum stearate alone had practically no stabilizing effect (Example 1). The synergistic effect of the aluminum salt, however, becomes evident by comparing the results of Examples 3 and 6.

EXAMPLES 7 to 13

PVC was stabilized under the conditions specified in Examples 1 to 6. Each time 1.5 parts of stabilizer were used for 100 parts of polymer. The stabilizer composition and the stability to rolling are listed in the following Table 2.

It can be seen that the stabilizer combination consisting of basic aluminum salt, calcium salt and zinc salt has the same efficiency as the combination of Example 6 containing neutral aluminum stearate.

EXAMPLES 14 to 16

100 Parts of a suspension polyvinyl chloride having a K value of 65 were intimately mixed with 0.5 part of glycerol monostearate, 0.8 part of a partially saponified ester wax on the basis of montan wax having an acid number of 13 and a saponification number of 112, 0.1 part of a polyethylene decomposition wax having a molecular weight of about 9,000 and 1.5 parts of the stabilizer combination indicated in Table 3 and the mixtures were rolled as described in Examples 1 to 6.

It can be seen that the stabilizer combinations according to the invention have a distinctly better stabilizing effect than the known combination of calcium and zinc stearate (Example 16) also in the presence of usual costabilizers.

TABLE 1

| Example No. | Stabilizer composition | | | Part by weight Stabilizer | Coloration of rough sheet after a rolling time of | | | | | |
| --- | --- | --- | --- | --- | --- | --- | --- | --- | --- | --- |
| | neutral aluminum stearate | calcium stearate | calcium stearate | | 10 ' | 20 ' | 30 ' | 35 ' | 40 ' | 45 ' |
| | (% by weight) | | | | to color number | | | | | |
| 1 | 100 | — | — | 1.5 | reddish brown | 4 | | | | |
| 2 | — | 50 | 50 | 1.0 | 1 | 1 | 5 | | | |
| 3 | — | 50 | 50 | 1.5 | 1 | 1 | 2 | 5 | | |
| 4 | 50 | 50 | — | 1.5 | reddish | red | 5 | | | |
| 5 | 50 | — | 50 | 1.5 | 1 | 5 | | | | |

TABLE 1-continued

| Example No. | Stabilizer composition | | | Part by weight Stabilizer | Coloration of rough sheet after a rolling time of | | | | | |
|---|---|---|---|---|---|---|---|---|---|---|
| | neutral aluminum stearate | calcium stearate | calcium stearate | | 10' | 20' | 30' | 35' | 40' | 45' |
| | (% by weight) | | | | to color number | | | | | |
| 6 | 33.3 | 33.3 | 33.3 | 1.5 | 1 | 1 | 1 | — | 2–3 | 5 |

TABLE 2

| Example No. | Composition of stabilizer | coloration of rough sheet after rolling time of | | | | | |
|---|---|---|---|---|---|---|---|
| | (% by weight) | 10' | 20' | 30' | 40' | 45' | 50' |
| | | to color number | | | | | |
| 7 | 15.0% Al$_2$(OH)$_5$ stearate<br>42.5% Ca stearate<br>42.5% Zn stearate | 1 | 1 | 1 | 2 | — | 4 |
| 8 | 33.3% Al$_2$(OH)$_5$ stearate<br>33.3% Ca stearate<br>33.3% Zn stearate | 1 | 1 | 1 | 2 | — | 4 |
| 9 | 33.4% Al$_2$(OH)$_5$ stearate<br>20.0% Ca stearate<br>46.6% Zn stearate | 1 | 1 | 1 | 4 | — | — |
| 10 | 33.4% Al$_2$(OH)$_5$ stearate<br>46.6% Ca stearate<br>20.0% Zn stearate | 1 | 1 | 1 | 3 | — | 3 |
| 11 | 33.3% Al(OH)$_2$ stearate<br>33.3% Ca stearate<br>33.3% Zn stearate | 1 | 1 | 2 | 3 | 4 | — |
| 12 | 33.3% Al$_2$(OH)$_5$ benzoate<br>33.3% Ca stearate<br>33.3% Zn stearate | 1 | 1 | 2 | 3 | 5 | — |
| 13 | 33.3% Al$_2$(OH)$_5$ stearate<br>33.3% Ca benzoate<br>33.3% Zn stearate | 1 | 2 | 2 | 4 | — | 5 |

TABLE 3

| Example No. | Composition of stabilizer | coloration of rough sheet after a rolling time of | | | | |
|---|---|---|---|---|---|---|
| | (% by weight) | 10' | 20' | 30' | 40' | 45' |
| | | to color number | | | | |
| 14 | 7 % neutral aluminum stearate<br>7 % Ca stearate<br>7 % Zn stearate<br>12 % α-phenylindole<br>20 % tris-nonyl-phenyl phosphite<br>47 % epoxidized soybean oil | 2 | 2 | 3 | 3–4 | 5 |
| 15 | 7 % Al$_2$(OH)$_5$ stearate<br>7 % Ca stearate<br>7 % Zn stearate<br>12 % α-phenylindole<br>20 % tris-nonyl-phenyl phosphite<br>47 % epoxidized soybean oil | 2 | 2 | 3 | 5 | |
| 16 | 10.5% Ca stearate<br>10.5% Zn stearate<br>12 % α-phenylindole<br>20 % tris-nonyl-phenyl phosphite<br>47 % epoxidized soybean oil | 2 | 2 | 5 | | |

What is claimed is:

1. A stabilizer combination for halogen-containing polymers consisting of a mixture of metal salts of aliphatic mono- or dicarboxylic acids having from 6 to 40 carbon atoms, optionally alkyl or alkoxy substituted aromatic mono-, di-, or tri-carboxylic acids having from 7 to 25 carbon atoms in the molecule, the mixtures being composed of 10 to 70% by weight of an aluminum salt, 10 to 80% by weight of a calcium salt and 10 to 70% by weight of a zinc salt of the aforesaid carboxylic acids.

2. A stabilizer combination as claimed in claim 1, wherein the acid radicals of the salts are identical or different.

3. A stabilizer combination as claimed in claim 2, wherein the salts are stearates.

4. A stabilizer combination as claimed in claim 1, wherein the aluminum, calcium and zinc salts are used in a proportion by weight of 1 : 1 : 1.

5. A stabilizer combination as claimed in claim 1, wherein the aluminum salt is a neutral or basic salt.

6. A stabilizer combination as claimed in claim 1, which contains additionally known costabilizers selected from the group consisting of phenols, organic phosphites, epoxide compounds, polyhydric alcohols and αphenylindole.

7. Method of heat-stabilizng halogen-containing polymers which comprises incorporating into the said polymers an effective amount of a stabilizer combination as claimed in claim 1.

8. A thermoplastic composition on the basis of halogen-containing polymers containing from 0.1 to 10 parts by weight of a stabilizer combination as claimed in claim 1 for 100 parts by weight of polymer.

\* \* \* \* \*